(12) United States Patent
Hashimoto et al.

(10) Patent No.: US 12,366,586 B2
(45) Date of Patent: Jul. 22, 2025

(54) CALIBRATION OF AN AUTOMATIC ANALYZER FOR REAGENT WATER EVAPORATION

(71) Applicant: CANON MEDICAL SYSTEMS CORPORATION, Otawara (JP)

(72) Inventors: Shozo Hashimoto, Nasushiobara (JP); Masahiro Masubuchi, Yaita (JP); Takashi Goto, Nasushiobara (JP); Tomohiro Sugimura, Otawara (JP); Yasuo Akizawa, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 991 days.

(21) Appl. No.: 17/443,025

(22) Filed: Jul. 20, 2021

(65) Prior Publication Data

US 2022/0026452 A1   Jan. 27, 2022

(30) Foreign Application Priority Data

Jul. 22, 2020   (JP) ................. 2020-125724

(51) Int. Cl.
   *G01N 35/00*   (2006.01)
(52) U.S. Cl.
   CPC ......... *G01N 35/00693* (2013.01); *G01N 2035/00702* (2013.01)
(58) Field of Classification Search
   CPC ......... G01N 35/00693; G01N 2035/00702
   USPC ..................... 422/63–67; 436/43–55
   See application file for complete search history.

(56) References Cited

U.S. PATENT DOCUMENTS

| | | | | |
|---|---|---|---|---|
| 3,220,246 A | * | 11/1965 | Barnum | G01N 35/08 137/637.1 |
| 5,122,969 A | * | 6/1992 | Seshimoto | G01N 35/00029 702/19 |
| 5,230,863 A | * | 7/1993 | Salpeter | G01N 35/08 250/252.1 |
| 5,462,879 A | * | 10/1995 | Bentsen | G01N 21/643 436/136 |
| 5,554,539 A | * | 9/1996 | Chadney | G01N 35/00594 702/85 |

(Continued)

FOREIGN PATENT DOCUMENTS

| | | | |
|---|---|---|---|
| JP | 57108639 A | * | 7/1982 |
| JP | 62144071 A | * | 6/1987 |

(Continued)

*Primary Examiner* — Arlen Soderquist
(74) *Attorney, Agent, or Firm* — Oblon, McClelland, Maier & Neustadt, L.L.P.

(57) ABSTRACT

An automatic analyzer disclosed herein includes a first calibration curve generator configured to generate a first calibration curve indicating a relationship between a concentration and an absorbance based on a result of an optical measurement of a reaction solution obtained by adding a reagent to a reference sample including a known concentration of an object to be detected; and a corrected calibration curve generator configured to generate, after the first calibration curve is generated, a corrected calibration curve based on a result of an optical measurement of a mixed reaction solution obtained by mixing the reagent and the reference sample or water, or an optical measurement of the reagent, and data relating to the first calibration curve.

9 Claims, 6 Drawing Sheets

(56) References Cited

U.S. PATENT DOCUMENTS

| | | | | |
|---|---|---|---|---|
| 5,582,796 A * | 12/1996 | Carey | ............... | G01B 35/1002 |
| | | | | 422/549 |
| 5,629,212 A * | 5/1997 | Herman | ............... | G01N 33/182 |
| | | | | 436/151 |
| 5,786,223 A * | 7/1998 | Terashima | ........... | G01N 33/521 |
| | | | | 422/63 |
| 5,851,488 A * | 12/1998 | Saul | ..................... | G01N 21/645 |
| | | | | 422/67 |
| 6,787,361 B1 * | 9/2004 | Klee | ...................... | G01N 33/50 |
| | | | | 702/22 |
| 8,916,095 B2 | 12/2014 | Shibuya et al. | | |
| 9,483,441 B2 | 11/2016 | Li et al. | | |
| 11,237,179 B2 * | 2/2022 | Tahara | ............. | G01N 35/00693 |
| 2003/0154044 A1 * | 8/2003 | Lundstedt | ........ | G01N 35/00871 |
| | | | | 702/181 |
| 2004/0086429 A1 * | 5/2004 | Hiramatsu | ....... | G01N 35/00663 |
| | | | | 422/403 |
| 2006/0160239 A1 * | 7/2006 | Lee | ...................... | G01N 21/314 |
| | | | | 134/2 |
| 2006/0264782 A1 * | 11/2006 | Holmes | ................ | A61B 5/1427 |
| | | | | 600/583 |
| 2007/0014700 A1 * | 1/2007 | Hiramatsu | ....... | G01N 35/00663 |
| | | | | 422/403 |
| 2009/0142231 A1 | 6/2009 | Shibuya et al. | | |
| 2009/0269242 A1 * | 10/2009 | Nozawa | ............... | G01N 21/274 |
| | | | | 422/68.1 |
| 2010/0099194 A1 * | 4/2010 | Okabayashi | ......... | G01N 21/253 |
| | | | | 436/55 |
| 2010/0105142 A1 * | 4/2010 | Fukuma | ................ | G16H 10/40 |
| | | | | 422/65 |
| 2012/0000268 A1 * | 1/2012 | Li | .................... | G01N 35/00613 |
| | | | | 73/1.01 |
| 2012/0015445 A1 * | 1/2012 | Kellner | .............. | G01N 33/1813 |
| | | | | 702/23 |
| 2012/0034702 A1 * | 2/2012 | Croud | ............... | G01N 33/2882 |
| | | | | 250/459.1 |
| 2013/0139616 A1 * | 6/2013 | Yamamoto | ............. | G16H 40/40 |
| | | | | 73/863.01 |
| 2013/0151189 A1 | 6/2013 | Li et al. | | |
| 2013/0266484 A1 | 10/2013 | Kamihara et al. | | |
| 2016/0097785 A1 * | 4/2016 | Horstmann | ............ | G01N 21/75 |
| | | | | 436/71 |
| 2016/0131671 A1 * | 5/2016 | Kie | ........................ | G16H 10/40 |
| | | | | 702/189 |
| 2018/0128741 A1 | 5/2018 | Kamihara et al. | | |
| 2019/0128907 A1 * | 5/2019 | Tahara | ................... | G01N 21/78 |
| 2022/0026452 A1 * | 1/2022 | Hashimoto | .......... | G01N 21/274 |

FOREIGN PATENT DOCUMENTS

| | | | | |
|---|---|---|---|---|
| JP | 64043760 A | * | 2/1989 | |
| JP | 01196572 A | * | 8/1989 | |
| JP | 09127122 A | * | 5/1997 | ....... G01N 35/00663 |
| JP | 09325150 A | * | 12/1997 | ....... G01N 35/00663 |
| JP | 2009-133796 A | | 6/2009 | |
| WO | WO 2012/011371 A1 | | 1/2012 | |
| WO | WO 2012/066891 A1 | | 5/2012 | |

* cited by examiner

CALIBRATION OF AN AUTOMATIC ANALYZER FOR REAGENT WATER EVAPORATION

CROSS REFERENCE TO RELATED APPLICATIONS

This application is based upon and claims the benefit of priority from the prior Japanese Patent Application No. 2020-125724, filed on Jul. 22, 2020, the entire contents of which are incorporated herein by reference.

FIELD

Embodiments described herein generally relate to automatic analyzers.

BACKGROUND

An automatic analyzer adds reagents corresponding to various test items to a sample to be tested such as blood of a patient containing a component to be detected. Each reagent reacts with a specific component of the sample to be tested. The automatic analyzer analyzes the component of the sample to be tested corresponding to the test item by optically measuring the reaction, for example.

A calibration curve is used for the optical measurement performed by the automatic analyzer. Therefore, a new calibration measurement is performed for generating a calibration curve before the sample to be tested is measured. A quality control (QC) measurement is performed before a new measurement of a sample is started in every morning, for example, to verify the validity of the calibration curve. If the result of the quality control measurement is not within a predetermined range, the user needs to perform a new calibration measurement again to generate another calibration curve before starting measurement of the day.

If a reagent is used for several days, sometimes the reagent may be concentrated due to the evaporation of water from the reagent bottle. The reagent concentration affects the blank value and the gradient of the calibration curve. Therefore, it is desired to maintain the measuring accuracy even if the reagent is concentrated.

DETAILED DESCRIPTION

Embodiments of automatic analyzers will now be described with reference to the accompanying drawings. In the following descriptions, elements having substantially the same structure and functions have the same numerical symbol, and the explanation of such elements is repeated only when it is necessary to do so.

First Embodiment (Automatic Analyzer)

Figure 1:
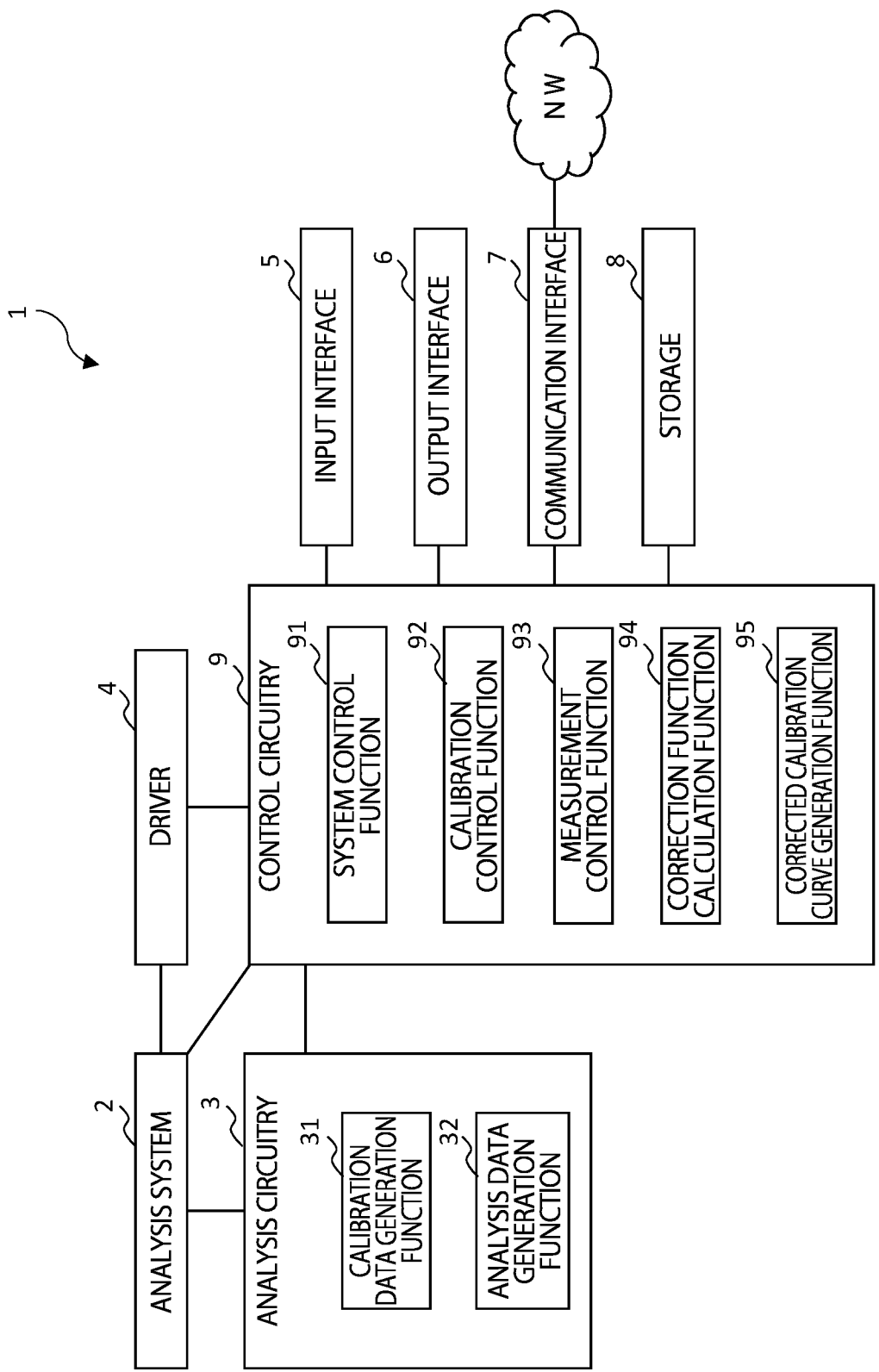
FIG. 1 is a block diagram illustrating the configuration and the functions of an automatic analyzer according to a first embodiment.

FIG. 1 is a block diagram illustrating an example of the configuration of an automatic analyzer 1 according to a first embodiment. The automatic analyzer 1 shown in FIG. 1 includes, for example, an analysis system 2, analysis circuitry 3, a driver 4, an input interface 5, an output interface 6, a communication interface 7, storage 8, and control circuitry 9.

For example, the automatic analyzer 1 measures the concentration of a sample using a latex agglutination method. Various insoluble carrier particles such as latex particles, polystyrene particles, polystyrene latex particles, and silica particles may be added to a reagent. Of course, various other methods may be used for measuring the concentration of a sample or the like by means of the automatic analyzer 1.

The analysis system 2 adds to a sample, such as a reference sample or a sample to be tested, a reagent to be used for a test performed on the sample. The analysis system 2 measures a reaction solution obtained by adding the reagent to the sample, and generates reference data and test data, for example. In the first embodiment, the reference data is obtained by measuring the absorbance of the reference sample for which the concentration of an object to be detected is known, and the test data is obtained by measuring the absorbance of the sample to be tested.

The analysis circuitry 3 is a processor that analyzes the reference data and the test data generated by the analysis system 2 to generate calibration data and analysis data. The calibration data contains, for example, information on the calibration curve generated based on the reference data. The analysis data contains, for example, information on the concentration of the object to be detected, which is included in the sample to be tested and obtained by analyzing the test data based on the calibration data.

The analysis circuitry 3 executes an operation program stored in the storage 8 to perform a function corresponding to the operation program, thereby generating the calibration data and the analysis data. For example, the analysis circuitry 3 generates a calibration curve based on 1) reference data with respect to a reference sample for which the absorbance is known and the concentration is 0 and one or more reference samples for each of which the concentration is known, 2) the concentration that is preset for each of the reference samples, and 3) preset photometric timing. The analysis circuitry 3 then calculates the calibration data including information on the calibration curve. The analysis circuitry 3 also generates the analysis data based on the test data, the calibration data including the calibration curve of the test item corresponding to the test data, and the preset photometric timing. The analysis circuitry 3 outputs the generated calibration data and analysis data to the control circuitry 9.

The control circuitry 9 controls the driver 4 to drive the analysis system 2. The driver 4 includes, for example, a gear, a stepping motor, a belt conveyor system, a lead screw and so on.

The input interface 5 receives, for example, analysis parameters for test items relating to the sample to be measured, from the user or through an intra-hospital network NW. Examples of the input interface 5 include a mouse device, a keyboard, and a touchpad that receives an input caused by a touch action on its surface. The input interface 5 is connected to the control circuitry 9, converts an operation instruction inputted by the user to an electrical signal, and outputs the electrical signal to the control circuitry 9. The input interface 5 herein is not limited to those having a physical operation component such as a mouse device or a keyboard. For example, the examples of the input interface 5 may also include electrical signal of processing circuitry that receives an electrical signal corresponding to an input from an input device that is external to the automatic analyzer 1 and outputs the electrical signal to the control circuitry 9.

The output interface 6 is connected to the control circuitry 9, and outputs a signal supplied from the control circuitry 9. Examples of the output interface 6 include display circuitry, print circuitry and so on. Examples of the display circuitry include a CRT display, a liquid crystal display, an organic EL display, an LED display, a plasma display, and so on. Examples of the display circuitry in the first embodiment also include processing circuitry that converts data representing an object to be displayed to a video signal, and outputs the video signal. Examples of the print circuitry include a printer. The print circuitry in the first embodiment also includes output circuitry that outputs data of an object to be printed.

For example, the communication interface 7 is connected to the intra-hospital network NW to connect the automatic analyzer 1 to the intra-hospital network NW. The communication interface 7 performs data communication with a hospital information system (HIS) via the intra-hospital network NW. The communication interface 7 may perform data communication with the HIS via a laboratory information system (LIS) that is connected to the intra-hospital network NW.

The storage 8 includes a non-transitory computer readable recording medium such as a magnetic or optic recording medium or a semiconductor memory. The storage 8 is not necessarily a single storage device. For example, the storage 8 may include a plurality of storage devices.

The storage 8 stores an operation program to be executed by the analysis circuitry 3, and an operation program to be executed by the control circuitry 9. The storage 8 stores information on the calibration curve of the reagent used in the analysis system 2. The calibration curve of the reagent used in the analysis system 2 is generated by the automatic analyzer 1 and stored as the calibration data in the storage 8. The details of such an operation will be described later. The calibration data stored in the storage 8 also includes, for example, data on the photometric timing preset for the reagent for each test item.

The photometric timing is a point in time at which information on the absorbance and others used for generating the calibration data including the calibration curve is obtained. The photometric timing thus indicates, for example, a lapse of time from the addition of a reagent to a reference sample, the reagent containing insoluble carrier particles to which a component to bind to an object to be detected is fixed. The photometric timing also indicates a point in time at which information such as the absorbance used for generating the analysis data is obtained. The photometric timing thus indicates a lapse of time from the addition of the reagent containing insoluble carrier particles to the sample to be tested.

The storage 8 thus stores the calibration data generated by the analysis circuitry 3 for each test item. The storage 8 also stores the analysis data generated by the analysis circuitry 3 for each sample to be tested.

The control circuitry 9 is a processor that is a main component of the automatic analyzer 1. The control circuitry 9 executes the operation program stored in the storage 8 to perform the function corresponding to the operation program. The control circuitry 9 may have a memory region for storing at least a portion of data stored in the storage 8.

Figure 2:
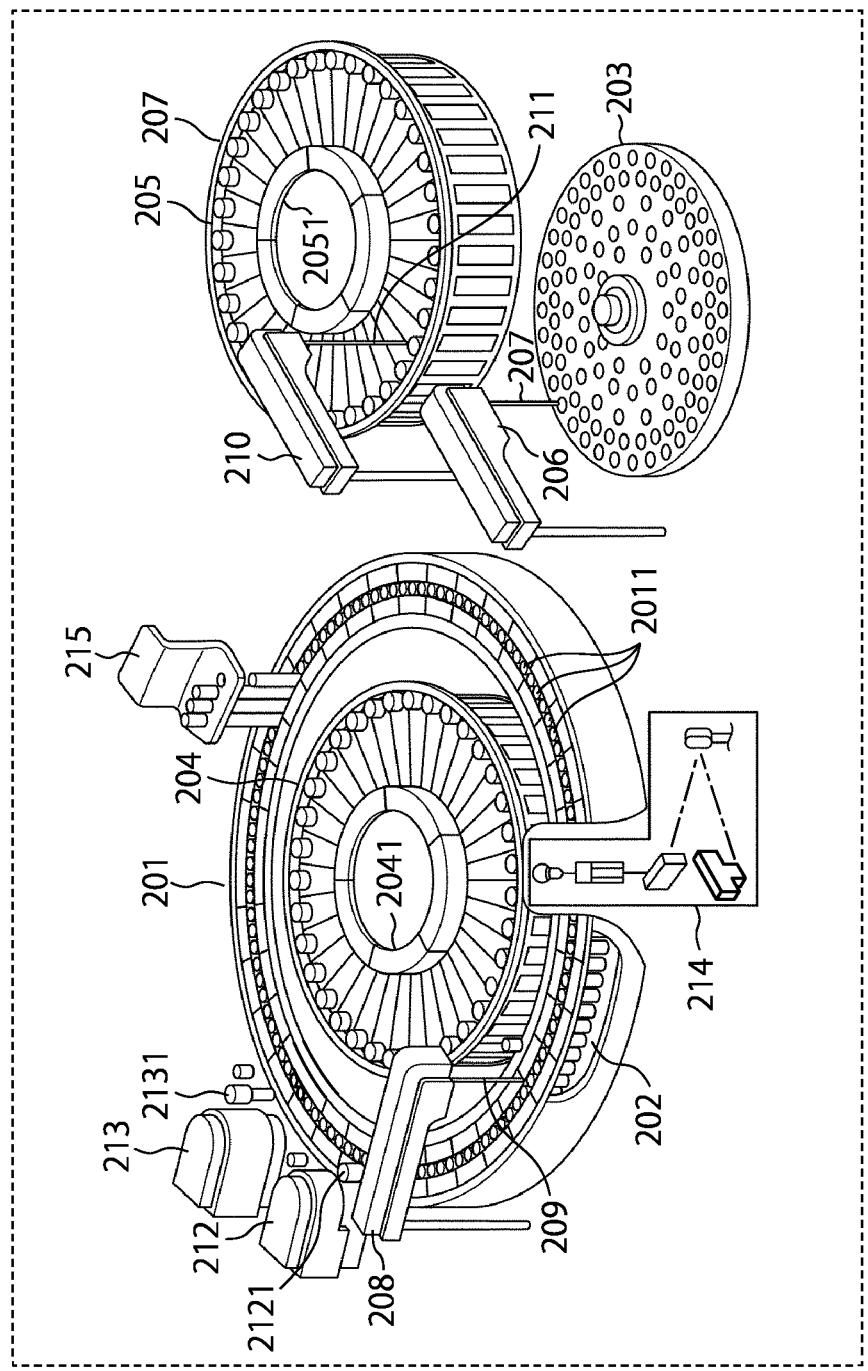
FIG. 2 is a diagram illustrating an example of the configuration of an analysis system included in the automatic analyzer shown in FIG. 1.

FIG. 2 is a schematic diagram illustrating an example of the configuration of the analysis system 2 shown in FIG. 1. As shown in FIG. 2, the analysis system 2 included in the automatic analyzer 1 according to the first embodiment includes a reaction disk 201, a constant-temperature unit 202, a sample disk 203, a first reagent carousel 204, and a second reagent carousel 205.

The reaction disk 201 carries reaction containers 2011 along a predetermined path. Specifically, the reaction disk 201 annularly arranges and stores the reaction containers 2011. The driver 4 causes the reaction disk 201 to alternately rotate and stop at predetermined time intervals.

The reaction container 2011 is formed of glass, for example. The reaction container 2011 is in a form of a quadrangular prism having an opening at the top. The quadrangular prism has first to fourth sidewalls. Light from a light source included in a photometer unit 214 is incident on the outer surface of the first sidewall. The light entering the reaction container 2011 from the outer surface of the first sidewall exits the reaction container 2011 from the outer surface of the second sidewall of the first to fourth sidewalls, which is arranged opposite to the first sidewall.

The constant-temperature unit 202 contains a heating medium, the temperature of which is set at a predetermined value. The reaction container 2011 is immersed in the heating medium contained in the constant-temperature unit 202, so that the temperature of the reaction solution in the reaction container 2011 is raised and kept at a predetermined value.

The sample disk 203 contains a plurality of sample containers each contains a sample. The driver 4 rotates the sample disk 203. In the first embodiment, any sample containing an object to be detected is sometimes referred to as a sample to be tested.

The first reagent carousel 204 cools a plurality of reagent containers, each of which contains a first reagent that reacts with a predetermined element of the reference sample and the sample to be tested. For example, the first reagent is a buffer solution containing bovine serum albumin (BSA). A reagent label is attached to each reagent container. An optical mark indicating reagent information is printed on the reagent label. The optical mark is an arbitrary pixel code such as a one dimensional pixel code or a two dimensional pixel code. The reagent information relates to the reagent contained in the reagent container, and includes, for example, the name of the reagent, the reagent manufacturer code, the reagent item code, the type of the bottle, the size of the bottle, the volume of the container, the manufacture lot number, and the period of validity.

The first reagent carousel 204 also cools a plurality of reference sample containers, each of which contains a reference sample. The reference samples contained in the reference sample containers include the same element having different concentrations. The reference sample containers may be stored in the sample disk 203.

A reagent rack 2041 is disposed in the first reagent carousel 204 in a rotatable manner. The reagent containers and the reference sample containers are annularly arranged and stored in the reagent rack 2041. The driver 4 rotates the reagent rack 2041. The first reagent carousel 204 includes therein a reader (not shown) that reads the reagent information from the reagent label attached to each reagent container. The read reagent information is stored in the storage 8.

A first reagent sucking position is set at a predetermined position on the first reagent carousel 204. For example, the first reagent sucking position is set at an intersection of the rotation path of a first reagent dispensing probe 209 and the motion path of the openings of the reagent containers and the reference sample containers that are annularly arranged in the reagent rack 2041.

The second reagent carousel 205 cools a plurality of reagent containers, each of which contains a second reagent that makes a pair with a first reagent of a two reagent system. The second reagent is a solution including an insoluble carrier in the form of carrier particles, for example, in which an antigen or an antibody that is bound to or dissociated from a specific antigen or a specific antibody included in the sample through a specific antigen-antibody reaction. Examples of those that are bound or dissociated through a specific reaction include enzymes, substrates, aptamers, and receptors. A reagent rack 2051 is disposed in the second reagent carousel 205 in a rotatable manner.

A plurality of reagent containers are annularly disposed and stored in the reagent rack 2051. The reference sample containers containing the reference samples may be cooled in the second reagent carousel 205. The driver 4 rotates the reagent rack 2051. The second reagent carousel 205 includes therein a reader (not shown) that reads the reagent information from the reagent label attached to each reagent container. The read reagent information is stored in the storage 8.

A second reagent sucking position is set at a predetermined position on the second reagent carousel 205. For example, the second reagent sucking position is set at an intersection of the rotation path of the second reagent dispensing probe 211 and the motion path of the openings of the reagent containers that are annularly arranged in the reagent rack 2051.

The analysis system 2 included in the automatic analyzer 1 shown in FIG. 2 also includes a sample dispensing arm 206, a sample dispensing probe 207, a first reagent dispensing arm 208, the first reagent dispensing probe 209 mentioned above, a second reagent dispensing arm 210, a second reagent dispensing probe 211, a first agitator unit 212, a second agitator unit 213, a photometer unit 214, and a cleaner unit 215.

The sample dispensing arm 206 is disposed between the reaction disk 201 and the sample disk 203. The driver 4 causes the sample dispensing arm 206 to freely move vertically and freely rotate horizontally. The sample dispensing arm 206 holds the sample dispensing probe 207 at an end thereof.

As the sample dispensing arm 206 rotates, the sample dispensing probe 207 rotates along a rotation path, which corresponds to an arc of a circle. The openings of the sample containers stored in the sample disk 203 are to be positioned on the rotation path of the sample dispensing probe 207. A sample discharging position at which the sample sucked by the sample dispensing probe 207 is discharged to one of the reaction containers 2011 is located on the rotation path of the sample dispensing probe 207. The sample discharging position is set at an intersection of the rotation path of the sample dispensing probe 207 and the motion path of the reaction containers 2011 stored in the reaction disk 201.

The driver 4 causes the sample dispensing probe 207 to move vertically immediately above the openings of the sample containers stored in the sample disk 203 or at the sample discharging position. The sample dispensing probe 207 sucks the sample from the sample container located immediately below the sample dispensing probe 207 in accordance with the control of the control circuitry 9. The sample dispensing probe 207 discharges the sucked sample to the reaction container 2011 located immediately below the sample discharging position in accordance with the control of the control circuitry 9.

The first reagent dispensing arm 208 is disposed near the periphery of the first reagent carousel 204. The driver 4 causes the first reagent dispensing arm 208 to freely move vertically and freely rotate horizontally. The first reagent dispensing arm 208 holds the first reagent dispensing probe 209 at an end thereof.

As the first reagent dispensing arm 208 rotates, the first reagent dispensing probe 209 rotates along a rotation path, which corresponds to an arc of a circle. The first reagent sucking position is located on the rotation path. A first reagent discharging position is set on the rotation path of the first reagent dispensing probe 209, at which the first reagent dispensing probe 209 discharges the sucked first reagent or the sucked reference sample to the reaction container 2011. The first reagent discharging position is set at an intersection of the rotation path of the first reagent dispensing probe 209 and the motion path of the reaction containers 2011 stored in the reaction disk 201.

The driver 4 causes the first reagent dispensing probe 209 to move vertically at the first reagent sucking position or the first reagent discharging position on the rotation path. The first reagent dispensing probe 209 sucks the first reagent or the reference sample from the reagent container located immediately below the first reagent sucking position in accordance with the control of the control circuitry 9. The first reagent dispensing probe 209 also discharges the sucked first reagent or the sucked reference sample to the reaction container 2011 located immediately below the first reagent discharging position in accordance with the control of the control circuitry 9.

The second reagent dispensing arm 210 is disposed near the periphery of the first reagent carousel 204. The driver 4 causes the second reagent dispensing arm 210 to freely move vertically and freely rotate horizontally. The second reagent dispensing arm 210 holds the second reagent dispensing probe 211 at an end thereof.

As the second reagent dispensing arm 210 rotates, the second reagent dispensing probe 211 rotates along a rotation path, which corresponds to an arc of a circle. The second reagent sucking position is located on the rotation path. A second reagent discharging position is set on the rotation path of the second reagent dispensing probe 211, at which the second reagent dispensing probe 211 discharges the sucked second reagent to the reaction container 2011. The second reagent discharging position is set at an intersection of the rotation path of the second reagent dispensing probe 211 and the motion path of the reaction container 2011 stored in the reaction disk 201.

The driver 4 causes the second reagent dispensing probe 211 to move vertically at the second reagent sucking position or the second reagent discharging position on the rotation path. The second reagent dispensing probe 211 sucks the second reagent from the reagent container located immediately below the second reagent sucking position as controlled by the control circuitry 9. The second reagent dispensing probe 211 also discharges the sucked second reagent to the reaction container 2011 located immediately below the second reagent discharging position as controlled by the control circuitry 9. Thus, the second reagent dispensing probe 211 is an example of a discharger of the first embodiment.

The first agitator unit 212 is disposed near the periphery of the reaction disk 201. The first agitator unit 212 has a first agitator arm 2121, and a first agitator disposed to the tip of the first agitator arm 2121. The first agitator included in the first agitator unit 212 agitates a mixed solution including the reference sample and the first reagent contained in the reaction container 2011 located at a first agitation position on the reaction disk 201. The first agitator included in the first agitator unit 212 also agitates a mixed solution including the sample to be tested and the first reagent contained in the reaction container 2011 located at the first agitation position on the reaction disk 201.

The second agitator unit 213 is disposed near the periphery of the reaction disk 201. The second agitator unit 213 has a second agitator arm 2131, and a second agitator disposed to the tip of the second agitator arm 2131. The second agitator included in the second agitator unit 213 agitates a mixed solution including the reference sample, the first reagent, and the second reagent contained in the reaction container 2011 located at the second agitation position on the reaction disk 201. The second agitator in the second agitator unit 213 also agitates a mixed solution including the sample to be tested, the first reagent, and the second reagent contained in the reaction container 2011 located at the second agitation position.

The photometer unit 214 optically measures a reaction solution of the sample, the first reagent, and the second reagent discharged to the reaction container 2011. The photometer unit 214 includes a light source and a photodetector. The photometer unit 214 emits light from the light source as controlled by the control circuitry 9. The emitted light enters the first sidewall of the reaction container 2011 and exits from the second sidewall opposite to the first sidewall. The photometer unit 214 detects the light from the reaction container 2011 by means of the photodetector.

Specifically, for example, the photodetector is disposed on the optical axis of the light from the light source to the reaction container 2011. The photodetector detects the light passing through the reaction solution including the reference sample, the first reagent, and the second reagent in the reaction container 2011, and generates reference data represented by the absorbance based on the intensity of the detected light. The photodetector also detects light passing through the reaction solution including the sample to be tested, first reagent, and the second reagent in the reaction container 2011, and generates test data represented by the absorbance based on the intensity of the detected light. The photometer unit 214 outputs the generated reference data and test data as a measurement result to the analysis circuitry 3.

The cleaner unit 215 cleans the inside of the reaction container 2011 after the measurement of the reaction solution by the photometer unit 214 is completed.

As shown in FIG. 1, the control circuitry 9 executes an operation program stored in the storage 8 to perform a function corresponding to the operation program. For example, the control circuitry 9 executes an operation program to perform a system control function 91, a calibration control function 92, and a measurement control function 93. In the first embodiment, the system control function 91, the calibration control function 92, and the measurement control function 93 are performed by means of a single processor. However, the functions may not be performed only by means of a single processor. For example, a plurality of independent processors may be combined to form the control circuitry, and the system control function 91, the calibration control function 92, and the measurement control function 93 may be realized by an operation program executed by each processor.

The system control function 91 is a function for comprehensively controlling each component of the automatic analyzer 1 based on information inputted from the input interface 5.

The calibration control function 92 is a function for controlling the analysis system 2 and the driver 4 to generate the reference data. Specifically, the control circuitry 9 performs the calibration control function 92 at a predetermined timing. Examples of the predetermined timing include the initial setting, the device activation, the maintenance, and the reception of an instruction from the user to start a calibration operation.

When the calibration control function 92 is performed, the control circuitry 9 controls the analysis system 2 and the driver 4. As a result, the analysis system 2 generates the reference data. Specifically, the driver 4 causes the first reagent dispensing probe 209 of the analysis system 2 to suck the reference sample from the first reagent carousel 204 and to discharge the sucked reference sample to the reaction container 2011. Subsequently, the first reagent dispensing probe 209 sucks the first reagent from the first reagent carousel 204, and discharges the sucked first reagent to the reaction container 2011 where the reference sample has been discharged. The first agitator unit 212 then agitates the solution obtained by adding the first reagent to the reference sample.

The second reagent dispensing probe 211 then sucks the second reagent from the second reagent carousel 205, and discharges the sucked second reagent to the mixed solution in which the reference sample is mixed with the first reagent. Subsequently, the second agitator unit 213 agitates the solution obtained by adding the second reagent to the mixed solution. The photometer unit 214 generates the reference data by optically measuring the reaction solution obtained by agitating the reference sample, the first reagent, and the second reagent. The photometer unit 214 outputs the generated reference data to the analysis circuitry 3. The photometer unit 214 repeats the measurement of the reaction solution a predetermined number of times at predetermined intervals, and outputs the generated reference data to the analysis circuitry 3. The analysis system 2 repeats the above operation for a predetermined number of reference samples each having a different concentration, and outputs the generated reference data to the analysis circuitry 3.

The measurement control function 93 is a function for controlling the analysis system 2 and the driver 4 to generate the test data. Specifically, the control circuitry 9 performs the measurement control function 93 in response to a predetermined instruction, such as an instruction to start the measurement operation from the user or an instruction indicating that a predetermined time has been reached.

When the measurement control function 93 is performed, the control circuitry 9 controls the analysis system 2 and the driver 4. As a result, the analysis system 2 generates the test data. Specifically, the driver 4 causes the sample dispensing probe 207 of the analysis system 2 to suck the sample to be tested from the sample disk 203 and discharge the sucked sample to be tested to the reaction container 2011. Subsequently, the first reagent dispensing probe 209 sucks the first reagent from the first reagent carousel 204 and discharges the sucked first reagent to the reaction container 2011 to which the sample to be tested has been discharged. The first agitator unit 212 then agitates the solution obtained by adding the first reagent to the sample to be tested.

The second reagent dispensing probe 211 then sucks the second reagent from the second reagent carousel 205 and discharges the sucked second reagent to the mixed solution in which the sample to be tested is mixed with the first reagent. Subsequently, the second agitator unit 213 agitates the solution obtained by adding the second reagent to the mixed solution. The photometer unit 214 generates the test data by optically measuring the reaction solution obtained by agitating the sample to be tested, the first reagent, and the second reagent. The photometer unit 214 outputs the generated test data to the analysis circuitry 3. The photometer unit 214 repeats the measurement of the reaction solution a predetermined number of times at predetermined intervals, and outputs the generated test data to the analysis circuitry 3.

The analysis circuitry 3 shown in FIG. 1 executes an operation program stored in the storage 8 to perform a function corresponding to the operation program. For example, the analysis circuitry 3 executes an operation program to perform a calibration data generation function 31 and an analysis data generation function 32. In the first embodiment, the calibration data generation function 31 and the analysis data generation function 32 are performed by means of a single processor. However, the functions may not be performed only by means of a single processor. For example, a plurality of independent processors may be combined to form the analysis circuitry, and the calibration data generation function 31 and the analysis data generation function 32 may be performed by an operation program executed by each processor.

The calibration data generation function 31 is a function for generating the calibration data based on the reference data generated by the analysis system 2. Specifically, the analysis circuitry 3 performs the calibration data generation function 31 when receiving the reference data generated by the analysis system 2. When the calibration data generation function 31 is performed, the analysis circuitry 3 generates a calibration curve based on the reference data, which correspond to measurement data including the absorbance of a plurality of reference samples each having a different concentration. The generated calibration curve is stored as the calibration data in the storage 8.

The analysis data generation function 32 is a function for generating the analysis data by analyzing the test data generated by the analysis system 2. Specifically, the analysis circuitry 3 performs the analysis data generation function 32 when receiving the test data generated by the analysis system 2. When the analysis data generation function 32 is performed, the analysis circuitry 3 reads the calibration data including information on the calibration curve from the storage 8. The analysis circuitry 3 generates the analysis data including information on the concentration of the object to be detected in the sample to be tested based on the test data and the calibration data.

(Calibration Curve Correcting Process)

A calibration curve correcting process performed by the automatic analyzer 1 according to the first embodiment will now be described in detail. In the first embodiment, a new calibration measurement is performed 1) when the reagent is full, i.e., when a new reagent bottle is opened (first calibration measurement), and 2) when a predetermined time passes after the new calibration measurement is performed, i.e., when the reagent may be concentrated (second calibration measurement). A correction coefficient of a correction function indicative of a correlation between the blank value and the gradient of the calibration curve is obtained using the blank values and the gradients of the calibration curves obtained in two new calibration measurements. The gradient of the calibration curve is corrected based on the blank value measured in the blank measurement that is performed at regular intervals. The calibration curve used for the measurement of the sample to be tested is corrected based on the corrected gradient and the blank value measured in the reagent blank measurement. As a result, the concentration in the sample to be tested is measured highly accurately even if the reagent is concentrated.

In the following descriptions, the first embodiment will be described in a case where a new calibration measurement is performed when a reagent is replaced with a new reagent with a different lot number, and a reagent blank measurement is performed before a quality control measurement is performed once a day or when the automatic analyzer 1 is started. Depending on the type of the reagent, the new calibration measurement may not be necessary even if the lot number of the new reagent is different from that of the old one. Therefore, in the first embodiment, the automatic analyzer 1 performs a new calibration measurement based on an instruction from the user. It may be possible, however, to set the automatic analyzer 1 to automatically perform a new calibration measurement every time a new reagent bottle with a different lot number is arranged. The automatic analyzer 1 according to the first embodiment thus acts as a calibration curve generator when a new calibration measurement is performed to generate a calibration curve.

Figure 3:
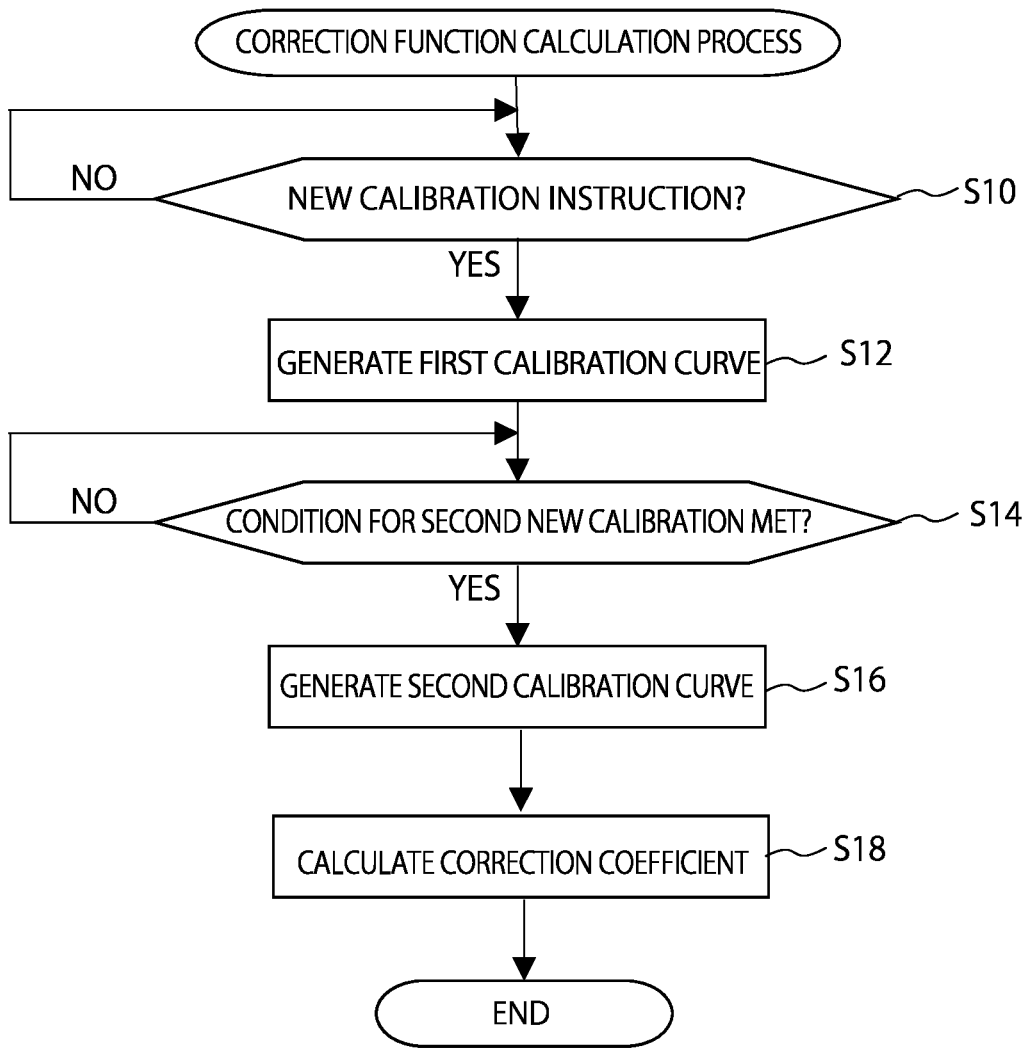
FIG. 3 is a flowchart for explaining a correction function calculation process performed by the automatic analyzer according to the first embodiment.

FIG. 3 is a flowchart for explaining a correction function calculation process performed by a correction function calculation function 94 of the control circuitry 9 included in the automatic analyzer 1 according to the first embodiment. More specifically, the correction function calculation process is performed when the analysis system 2, the analysis circuitry 3, and the driver 4 perform their respective functions under the control of the correction function calculation function 94 of the control circuitry 9.

As shown in FIG. 3, the correction function calculation function 94 of the control circuitry 9 first determines whether an instruction to perform a new calibration measurement is inputted (step S10). When a new calibration measurement is needed, the user inputs an instruction to perform a new calibration measurement through the input interface 5. In the first embodiment, for example, when a reagent bottle containing a reagent is replaced with a new one, and the lot number of the new reagent bottle is different from that of the old one, the user inputs an instruction to perform a new calibration measurement.

If no instruction for performing a new calibration measurement is inputted (No in step S10), the correction function calculation function 94 of the control circuitry 9 repeats step S10 and waits. If an instruction for performing a new calibration measurement is inputted (Yes in step S10), the correction function calculation function 94 of the control circuitry 9 performs a new calibration measurement to obtain a first calibration curve indicative of the relationship between the concentration and the absorbance (step S12).

More specifically, the correction function calculation function 94 of the control circuitry 9 controls the analysis system 2, the analysis circuitry 3, and the driver 4 to perform a new calibration measurement. In the new calibration measurement, a reagent is put into a reference sample containing an objection to be detected having a known concentration, the reagent including insoluble carrier particles, to which an element that is to bond with the object to be detected is fixed. The reaction solution including the reference sample and the reagent is optically measured. Specifically, the reaction solution obtained by adding to a reference sample a first reagent and a second reagent that makes a pair with the first reagent is optically measured by the photometer unit 214 to obtain the absorbance of the reaction solution. This step is repeated for several reference samples having different concentrations. The first calibration curve indicative of the relationship between the concentrations and the absorbance of the used reference samples is generated in this manner.

Figure 4:
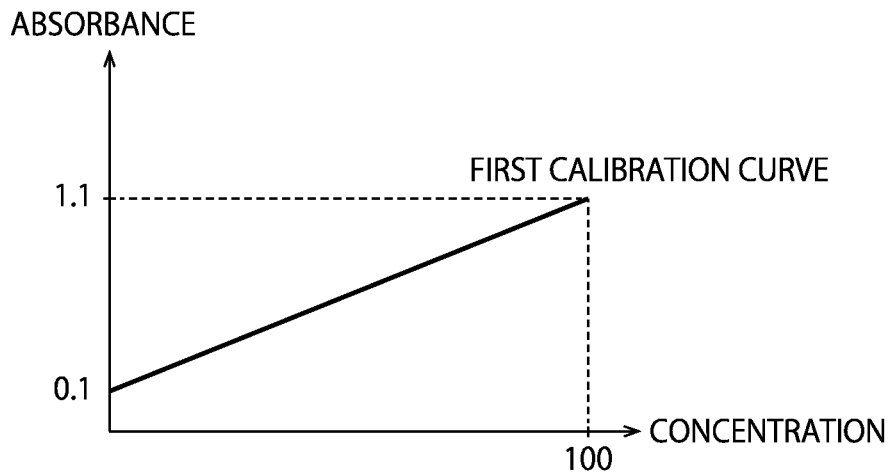
FIG. 4 is a diagram illustrating an example of a first calibration curve generated by the automatic analyzer according to the first embodiment.

FIG. 4 is a diagram illustrating an example of the first calibration curve generated by the automatic analyzer 1 according to the first embodiment. In the example shown in FIG. 4, a first blank value, which is the blank value of the first calibration curve, is 0.1. The blank value is a value indicative of the absorbance when a reference sample including no object to be detected is used (therefore the concentration of the object to be detected is zero). The absorbance when the reference sample having a concentration of 100 is 1.1. The concentration of 100 means that a reference sample having a maximum concentration of the object to be detected is selected from the reference samples of a calibrator of the automatic analyzer 1. Thus, "the concentration of 100" is not an absolute value but a relative value.

In the first embodiment, the gradient of the calibration curve is defined as the change of concentration relative to the change of absorbance. Therefore, the gradient of the calibration curve=concentration/absorbance. If the gradient of the first calibration curve shown in FIG. 4 is defined as a first gradient, first gradient=$(100-0)/(1.1-0.1)=100$.

Thereafter, as shown in FIG. 3, the correction function calculation function 94 of the control circuitry 9 determines whether a condition for determining the necessity for a second new calibration measurement is met (step S14). Thus, whether it is necessary to perform a second new calibration measurement to generate a second calibration curve is determined. There may be a variety of conditions indicating the necessity of generating a second calibration curve. For example, it may be possible to determine that the condition is met when the remaining amount of reagent in the reagent bottle reaches equal to or less than a predetermined level. The remaining amount of reagent is always monitored by the analysis system 2. The correction function calculation function of the control circuitry 9 determines the state of the condition based on the remaining amount of reagent. For example, it may be possible to determine that the condition for the necessity of generating the second calibration curve is met when the remaining amount of reagent reaches equal to or less than 10%.

Alternatively, it may be possible to determine that a condition for the necessity of generating a second calibration curve is met when a predetermined time passes after the generation of the first calibration curve. In this case, the correction function calculation function 94 of the control circuitry 9 stores the date and the time when the first calibration curve is generated, and determines that the condition for the necessity of generating a second calibration curve is met when three days, for example, pass since the first calibration curve is generated. It may be possible to determine that the condition for the necessity of generating a second calibration curve is met when 100 hours lapse since the generation of the first calibration curve. It may be appropriate to use the lapse of time after the reagent bottle is opened as the reagent if the concentration of the reagent is taken into account. However, it is difficult to strictly record when the reagent bottle is opened. Therefore, in the first embodiment, the reference point in time is set to be the generation of the first calibration curve. It may be possible, however, that the user inputs the date and the time when a reagent bottle is opened through the input interface 5, or that the control circuitry 9 records the date and the time when a reagent bottle is set in the automatic analyzer 1, so as to determine whether a predetermined time passes from the date and the time.

If the condition for the necessity of performing a second new calibration measurement is not met (No in step S14), the correction function calculation function 94 of the control circuitry 9 repeats step S14 and waits. If the condition for the necessity of performing a second new calibration measurement is met (Yes in step S14), the correction function calculation function 94 of the control circuitry 9 performs a new calibration measurement again to obtain a second calibration curve indicative of the relationship between the concentration and the absorbance (step S16).

More specifically, the correction function calculation function 94 of the control circuitry 9 controls the analysis system 2, the analysis circuitry 3, and the driver 4 to perform a second new calibration measurement. Like the first new calibration measurement, a reagent including insoluble carrier particles to which an element that is to bond with the object to be detected is fixed is put into a reference sample, and the reaction solution including the reference sample and the reagent is optically measured in the second new calibration measurement. Specifically, the reaction solution obtained by adding to a reference sample a first reagent and a second reagent that is used with the first reagent is optically measured by the photometer unit 214 to obtain the absorbance of the reaction solution. This step is repeated for several reference samples having different concentrations. The second calibration curve indicative of the relationship between the concentrations and the absorbance of the used reference samples is generated in this manner.

Figure 5:
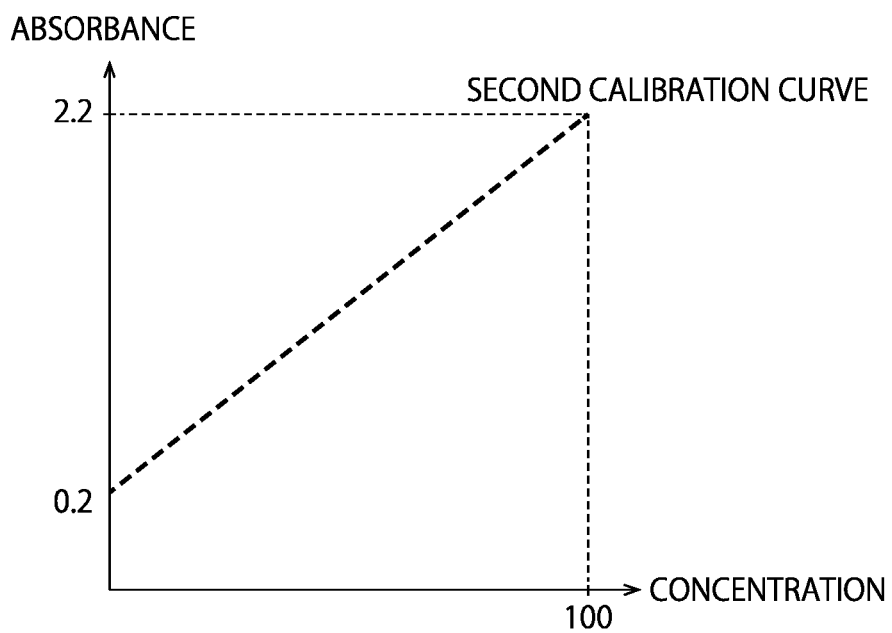
FIG. 5 is a diagram illustrating an example of a second calibration curve generated by the automatic analyzer according to the first embodiment.

FIG. 5 is a diagram illustrating an example of the second calibration curve generated by the automatic analyzer 1 according to the first embodiment. In the example shown in FIG. 5, a second blank value, which is the blank value of the second calibration curve, is 0.2. The absorbance when the reference sample having a concentration of 100 is 2.2. If the gradient of the second calibration curve shown in FIG. 5 is defined as a second gradient, second gradient=$(100-0)/(2.2-0.2)=50$.

Thereafter, as shown in FIG. 3, the correction function calculation function 94 of the control circuitry 9 calculates the correction coefficient of the correction function indicative of the correlation between the blank value and the gradient of the calibration curve (step S18). Specifically, the correction function calculation function 94 calculates the correction coefficient using the first blank value and the first gradient of the first calibration curve and the second blank value and the second gradient of the second calibration curve.

In the first embodiment, the correction coefficient is calculated as (second gradient−first gradient)/(second blank value−first blank value). The correction coefficient calculated using the values obtained from FIGS. 4 and 5 is (50−100)/(0.2−0.1)=−500. This means that when the blank value increases by 1, the gradient decreases by 500, and when the blank value increases by 0.1, the gradient decreases by 50.

The calculated correction coefficient for the correction function may be stored in the control circuitry 9 or the storage 8. After step S18, the correction function calculation process according to the first embodiment ends.

The wavelength of the light used by the photometer unit 214 for measuring the absorbance of the reaction solution may be determined in such a manner that the measurement result of the first new calibration measurement is compared with the measurement result of the second new calibration measurement, and the wavelength resulting to a greatest change is employed as an indicator. Specifically, the absorbance may be measured by the photometer unit 214 using a plurality of lights having different wavelengths, the first calibration curve and the second calibration curve may be generated for each case, and the correction coefficient of the correction function may be calculated using the first calibration curve and the second calibration curve generated by using the light having a wavelength that led to the greatest change.

In the automatic analyzer 1 according to the first embodiment, when the correction function calculation function 94 of the control circuitry 9 performs step S12, the correction function calculation function 94 of the control circuitry 9 acts as a first calibration curve generator. When the correction function calculation function 94 of the control circuitry 9 performs step S16, the correction function calculation function 94 of the control circuitry 9 acts as a second calibration curve generator. When the correction function calculation function 94 of the control circuitry 9 performs step S18, the correction function calculation function 94 of the control circuitry 9 acts as a correction coefficient calculator.

Figure 6:
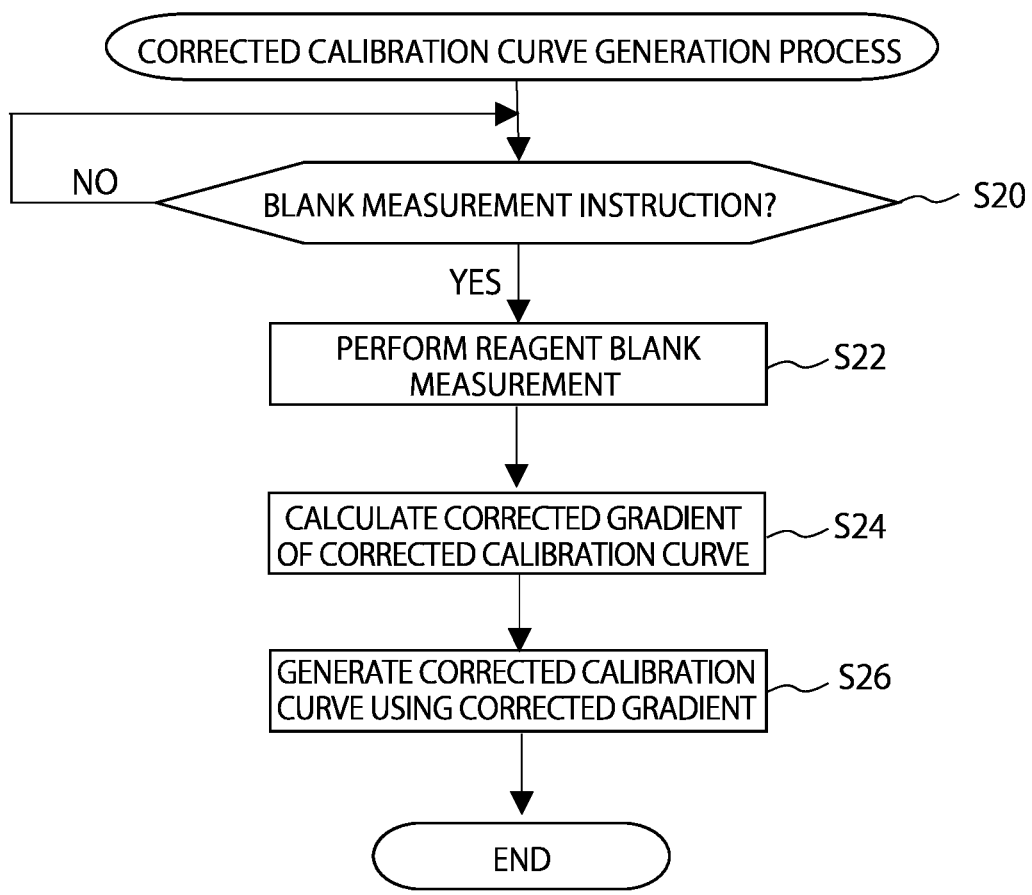
FIG. 6 is a flowchart for explaining a corrected calibration curve generation process performed by the automatic analyzer according to the first embodiment.

A corrected calibration curve generation process is performed after the correction function calculation process. This process will now be described. FIG. 6 is a flowchart of the corrected calibration curve generation process according to the first embodiment. The corrected calibration curve generation process is performed by a corrected calibration curve generation function 95 of the control circuitry 9. More specifically, the corrected calibration curve generation process is performed when the analysis system 2, the analysis circuitry 3, and the driver 4 perform their respective functions under the control of the corrected calibration curve generation function 95 of the control circuitry 9.

As shown in FIG. 6, the corrected calibration curve generation function 95 of the control circuitry 9 determines whether an instruction to perform a reagent blank measurement is inputted (step S20). When a reagent blank measurement is needed, the user inputs an instruction to perform a reagent blank measurement through the input interface 5. The timing at which a reagent blank measurement is performed may be arbitrarily determined. For example, in the first embodiment, a reagent blank measurement is performed before a quality control measurement is performed in a hospital in which the automatic analyzer 1 is installed. The quality control measurement is performed every morning before a measurement of a sample to be tested is performed. Alternatively, the quality control measurement may be performed twice a day, in the morning and in the evening, before a sample to be tested is measurement, and a reagent blank measurement may be performed before the quality control measurement. In the first embodiment, the validity of the calibration curve used in the measurement of a sample to be tested may be evaluated by performing the reagent blank measurement.

If no instruction for performing a reagent blank measurement is inputted (No in step S20), the corrected calibration curve generation function 95 of the control circuitry 9 repeats step S20 and waits. If an instruction for performing a reagent blank measurement is inputted (Yes in step S20), the corrected calibration curve generation function 95 of the control circuitry 9 performs a reagent blank measurement to obtain a corrected blank value, which is a blank value of the reagent at that time (step S22).

More specifically, the corrected calibration curve generation function 95 of the control circuitry 9 controls the analysis system 2, the analysis circuitry 3, and the driver 4 to perform a reagent blank measurement. In the reagent blank measurement, a reagent is put into a reference sample in which the concentration of an object to be detected is zero, the reagent including insoluble carrier particles, to which an element that is to bond with the object to be detected is fixed. The reaction solution including the reference sample and the reagent is optically measured. Specifically, the reaction solution obtained by adding to a reference sample a first reagent and a second reagent that is used with the first reagent is optically measured by the photometer unit 214 to obtain the absorbance of the reaction solution. The absorbance corresponds to the corrected blank value.

The reagent blank measurement may be performed by using internal water stored in the automatic analyzer 1 for a dispensing operation, or water such a physiological saline solution instead of the reference sample in which the concentration of the object to be detected is zero. In other words, the reagent blank measurement may be performed by using a certain fluid including substantially no object to be detected (the concentration of the object to be detected is zero). Alternatively, the sample dispensing probe 207 does not dispense the reagent and the water to the container 2011 but only the reagent may be dispensed to the container 2011 to perform the reagent blank measurement. In this case, the first reagent dispensing probe 209 and/or the second reagent dispensing probe 211 may dispense the water to the reaction container 2011 in addition to the reagent.

Thereafter, as shown in FIG. 6, the corrected calibration curve generation function 95 of the control circuitry 9 calculates a corrected gradient using the obtained corrected blank value. The corrected gradient is a gradient of the corrected calibration curve used for the measurement of the sample to be tested (step S24). Specifically, the corrected gradient is calculated by substituting the corrected blank value obtained at step S22 and the correction coefficient obtained at step S18 in the correction function.

In the first embodiment, the corrected gradient is calculated by the following formula: first gradient+correction coefficient×(corrected blank value−first blank value). If the corrected blank value in the examples shown in FIGS. 4 and 5 is 0.15, the corrected gradient is 100+(−500)×(0.15−0.1) =75.

The calculation for obtaining the corrected gradient of the corrected calibration curve in step S24 is just an example of proportionally dividing the difference between the first calibration curve and the second calibration curve from the concentration of 0% to the concentration of 100%. Obtaining the corrected gradient of the corrected calibration curve based on the corrected blank value means that the entire corrected calibration curve is proportionally divided based on the proportional division ratio which is a ratio of the corrected blank value proportionally dividing the difference between the first blank value of the first calibration curve and the second blank value of the second calibration curve.

Thereafter, as shown in FIG. 6, the corrected calibration curve generation function 95 of the control circuitry 9 generates a corrected calibration curve, which is used for the measurement of the sample to be tested, based on the corrected gradient calculated at step S24 and the corrected blank value obtained at step S22 (step S26). The corrected calibration curve is corrected based on the first calibration curve, the second calibration curve, and the corrected blank value.

Figure 7:
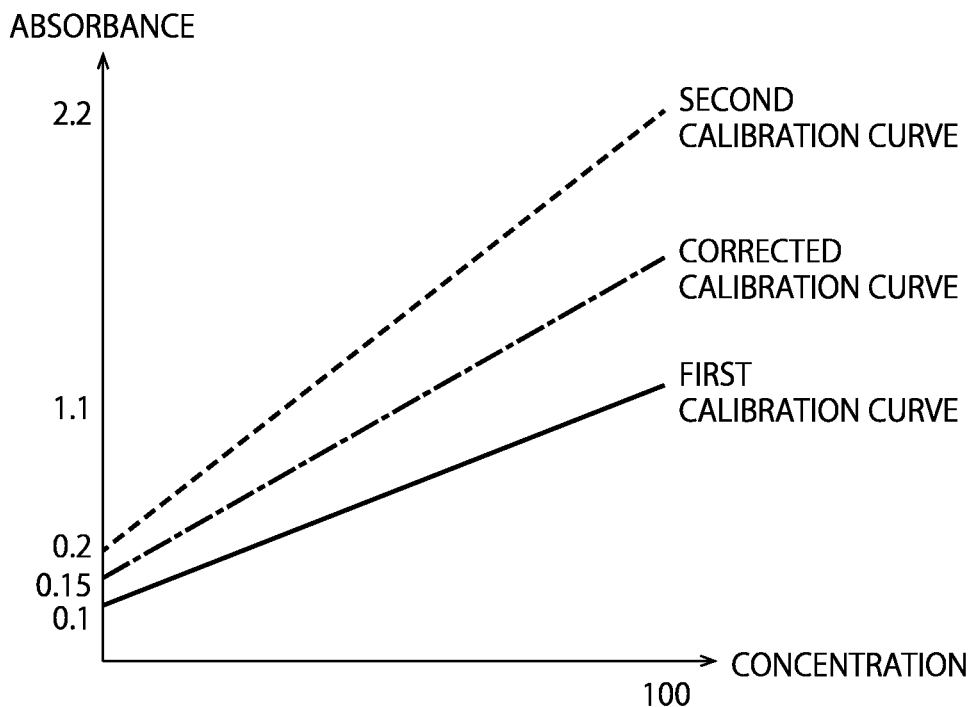
FIG. 7 is a diagram showing a corrected calibration curve which is a calibration curve generated by the automatic analyzer according to the first embodiment together with the first calibration curve and the second calibration curve.

FIG. 7 is a diagram showing the corrected calibration curve generated at step S26 together with the first calibration curve and the second calibration curve. As shown in FIG. 7, in the automatic analyzer 1 according to the first embodiment, not only the blank value but also the gradient of the calibration curve used for the measurement of a sample to be tested is corrected based on the blank value measured in the reagent blank measurement using the correlation between the blank value and the gradient of the calibration curve. As a result, even if the reagent is concentrated, the sample to be tested may be measured with a more appropriate calibration curve.

The corrected calibration curve generated at step S26 may be recorded and stored in the control circuitry 9 or the storage 8. After step S26, the corrected calibration curve generation process ends.

Thereafter, the automatic analyzer 1 according to the first embodiment measures the sample to be tested in accordance with an instruction from the user. For example, in the first embodiment, the analysis system 2, the analysis circuitry 3, and the driver 4 perform their respective functions under the control of the measurement control function 93 of the control circuitry 9 to measure the sample to be tested. More specifically, a reagent is put into a sample containing an object to be detected to make a reaction solution, and the concentration of the object to be detected in the sample is calculated based on the result of an optical measurement of the obtained reaction solution and the corrected calibration curve.

In the automatic analyzer 1 according to the first embodiment, the corrected calibration curve generation function 95 of the control circuitry 9 corresponds to a corrected calibration curve generator when performing the corrected calibration curve generation process. Furthermore, the measurement control function 93 of the control circuitry 9 corresponds to a sample concentration calculator when performing the measurement of the sample to be tested.

As described above, the automatic analyzer 1 according to the first embodiment calculates the correction coefficient for the correction function indicating the correlation of the blank value and the gradient of the calibration curve based on the first calibration curve obtained in the first new calibration measurement and the second calibration curve obtained in the second new calibration measurement. Then, the gradient of the calibration curve used for the measurement of the sample to be tested is corrected based on the correction function using the blank value measured during the reagent blank measurement. Therefore, even if the reagent is concentrated in the reagent bottle, the sample to be tested may be measured with an appropriate calibration curve (corrected calibration curve) obtained in consideration of the concentration. The measurement accuracy may thus be improved.

If the reagent is used up and the reagent bottle is replaced, the characteristic of the calibration curve may be unchanged if the lot number of the replaced reagent is the same. Therefore, if the lot number of the reagent bottles is the same, the calibration curve measurement for generating the corrected calibration curve used for measuring the sample to be tested may be performed at a high accuracy.

For a reagent having a calibration curve characteristic that does not considerably change regardless of the lot number, the correction coefficient that has already been calculated may be used for a replaced reagent. Therefore, the calibration curve measurement for generating the corrected calibration curve used for measuring the sample to be tested may be performed at a high accuracy.

Second Embodiment

In the first embodiment described above, the configuration and the operation of the automatic analyzer 1 is explained by taking an example in which the first calibration curve, the second calibration curve, and the corrected calibration curve are linear. In a second embodiment described below, the configuration and the operation of the automatic analyzer 1 will be explained by taking an example in which the first calibration curve, the second calibration curve, and the corrected calibration curve are nonlinear.

Figure 8:
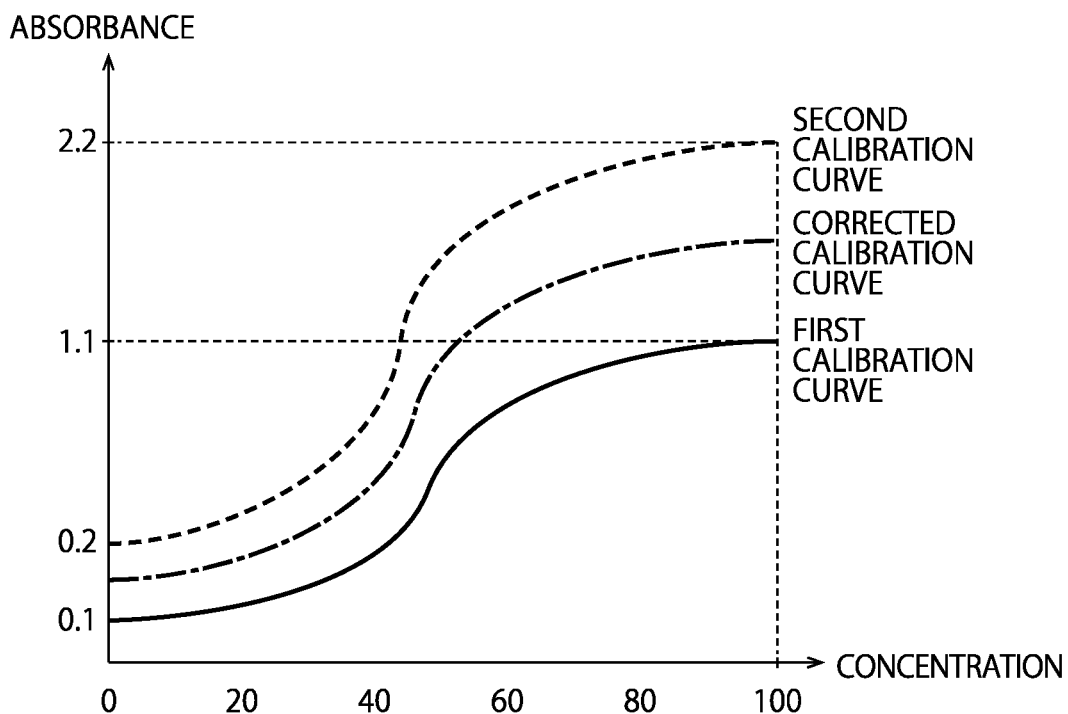
FIG. 8 is a diagram showing a corrected calibration curve which is a calibration curve generated by an automatic analyzer according to a second embodiment together with a first calibration curve and a second calibration curve.

FIG. 8 is a diagram showing the first calibration curve, the second calibration curve and the corrected calibration curve generated by an automatic analyzer 1 according to the second embodiment. FIG. 8 corresponds to FIG. 7 relating to the first embodiment. The correction function calculation process and the corrected calibration curve generation process performed by the automatic analyzer 1 according to the second embodiment are the same as those in the first embodiment. The difference between the second embodiment and the first embodiment is the shape of the calibration curves, which is nonlinear.

As shown in FIG. 8, in the second embodiment, the first calibration curve and the second calibration curve generated by the correction function calculation function 94 of the control circuitry 9 are nonlinear, and the corrected calibration curve generated by the corrected calibration curve generation function 95 of the control circuitry 9 is also nonlinear. Examples of the function for generating nonlinear calibration curves include the Log it-4 function and the spline function.

Also in the second embodiment, the correction coefficient is calculated by the formula (second gradient−first gradient)/(second blank value−first blank value) at step S18 in the correction function calculation process. In the example shown in FIG. 8, the first gradient is calculated as (100−0)/(1.1−0.1)=100, and the second gradient is calculated as (100−0)/(2.2−0.2)=50. Thus, when a nonlinear calibration curve is used, the gradient of the entire calibration curve is defined as the first gradient or the second gradient. Therefore, at step S18, the correction coefficient is calculated as (50−100)/(0.2−0.1)=−500. This means that if the blank value increases by 1, the gradient decreases by 500, or if the blank value increases by 0.1, the gradient decreases by 50.

As in the first embodiment described above, the correction coefficient for the correction function calculated by using the first calibration curve and the second calibration curve may be stored in the control circuitry 9 or the storage 8. The configuration and the operation other than those mentioned above are the same as those of the automatic analyzer 1 according to the first embodiment. Thus, the corrected calibration curve used for the measurement of the sample to be tested is generated in the corrected calibration curve generation process using the correction coefficient calculated at step S18. The corrected calibration curve is entirely corrected based on the proportional division ratio which is a ratio of the corrected blank value proportionally dividing the difference between the first blank value of the first calibration curve and the second blank value of the second calibration curve.

As described above, the automatic analyzer 1 according to the second embodiment is capable of generating the first calibration curve, the second calibration curve, and the corrected calibration curve as nonlinear calibration curves. Even if the nonlinear calibration curves are used, the correction coefficient for the correction function indicating the correlation of the blank value and the gradient of the calibration curve may be calculated by the two new calibration measurements, and the gradient of the calibration curve used for the measurement of the sample to be tested may be corrected based on the correction function using the blank value measured in the reagent blank measurement. Therefore, even if the reagent is concentrated in the reagent bottle, the sample measurement may be performed with an appropriate calibration curve (corrected calibration curve) obtained in consideration of the concentration. The measurement accuracy may thus be improved.

Third Embodiment

In the first embodiment and the second embodiment described above, a single correction coefficient is used for the correction function. However, the number of correction coefficients in the correction function is not limited to one. An automatic analyzer 1 according to a third embodiment uses two correction coefficients A and B.

The correction function calculation process and the corrected calibration curve generation process in the automatic analyzer 1 according to the third embodiment are the same as those in the first embodiment and the second embodiment. However, the correction function indicating the correlation of the blank value and the gradient of each calibration curve is different. Specifically, the correction function includes a first correction coefficient A and a second correction coefficient B. With respect to the first calibration curve, the following equation is set:

first gradient×first blank value=first correction coefficient $A$+second correction coefficient $B$×first blank value.

With respect to the second calibration curve the following equation is set:

second gradient×second blank value=first correction coefficient $A$+second correction coefficient $B$×second blank value.

The first correction coefficient A and the second correction coefficient B are calculated from the above two equations.

More specifically, at step S18 in the correction function calculation process shown in FIG. 3, first, the equation first gradient×first blank value=first correction coefficient $A$+second correction coefficient $B$×first blank value is set based on the first calibration curve obtained at step S12. Thereafter, the equation second gradient×second blank value=first correction coefficient $A$+second correction coefficient $B$×second blank value is set based on second calibration curve obtained at the step S16. By solving the simultaneous equation including the above two equations, the first correction coefficient A and the second correction coefficient B are calculated.

For example, if the first gradient of the first calibration curve is 100 and the first blank value is 0.1, the equation 100×0.1=first correction coefficient $A$+second correction coefficient $B$×0.1 can be calculated based on the first calibration curve. Then, if the second gradient of the second calibration curve is 90 and the second blank value is 0.2, the equation 90×0.2=first correction coefficient $A$+second correction coefficient $B$×0.2 can be calculated based on the second calibration curve. By solving the simultaneous equation including the above two equations, the first correction coefficient A is obtained as 2, and the second correction coefficient B is obtained as 80.

Like the first embodiment, the first correction coefficient A and the second correction coefficient B for the correction function may be stored in the control circuitry 9 or the storage 8.

At step S26 of the corrected calibration curve generation process shown in FIG. 6, the gradient of the calibration curve is corrected to generate the corrected calibration curve by means of the correction function using the first correction coefficient A and the second correction coefficient B. In the third embodiment, the corrected gradient is calculated by the following formula:

first correction coefficient/corrected blank value+ second correction coefficient.

If the corrected blank value determined by the reagent blank measurement is 0.15, the corrected gradient is defined as 2/0.15+80=93.333 . . . . Therefore, the corrected calibration curve obtained by setting the corrected gradient as 93.3 and the corrected blank value as 0.15 is used for the measurement of the sample to be tested.

If the corrected blank value determined by the reagent blank measurement is 0.3, the corrected gradient is defined as 2/0.3+80=86.666 . . . . Therefore, the corrected calibration curve obtained by setting the corrected gradient as 86.7 and the corrected blank value as 0.3 is used for the measurement of the sample to be tested. The value 0.3 of the corrected blank value is beyond the range of the first blank value, which is 0.1, and the second blank value, which is 0.2. Thus, the corrected gradient may be calculated by extrapolation based on the corrected blank value that is in a range outside the range of the first blank value and the second blank value. The entire corrected calibration curve is proportionally divided based on the proportional division ratio which is a ratio of the corrected blank value proportionally dividing the difference between the first blank value of the first calibration curve and the second blank value of the second calibration curve.

As described above, the automatic analyzer 1 according to the third embodiment calculates the first correction coefficient A and the second correction coefficient B for the correction function indicating the correlation of the blank value and the gradient of the calibration curve by the two new calibration measurements. Then, the automatic analyzer 1 according to the third embodiment performs the reagent blank measurement before performing the quality control measurement to correct the gradient of the calibration curve so as to perform the measurement of the sample to be tested based on the correction function using the measured blank value. Therefore, even if the reagent is concentrated in the reagent bottle, the sample may be measured with an appropriate calibration curve (corrected calibration curve) in consideration of the concentration. The measurement accuracy may thus be improved.

In the automatic analyzer 1 according to the third embodiment, if the corrected blank value measured by the reagent blank measurement is outside the range of the two blank values obtained in the two new calibration measurements, the corrected gradient can be calculated, and the corrected calibration curve used for the measurement of the sample to be tested can be generated. Therefore, the gradient of the calibration curve can be corrected in a broader range.

In the above-described example, the number of correction coefficients used in the correction function is two. However, the number may be more than two, such as three or four. If three or four correction coefficients are used in the correction function, the number of calibration curves for calculating the correction function should be three or four. Thus, the number of calibration curves generated by new calibration measurements needs to be the same as the number of correction coefficients used in the correction function.

For example, if the correction function has three correction coefficients, three calibration curves should be generated by new calibration measurements performed when the remaining amount of the reagent is 100%, 50%, and 10%, for example. Then, three values of the correction coefficients in the correction function each indicating the correlation of the blank value and the gradient are obtained based on the three calibration curves. Then, the gradient of the calibration curve used for the measurement of the sample to be tested is calculated by substituting, in the correction function, the blank value measured in the reagent blank measurement.

In the above-described examples, the processor reads a program corresponding to a function from the storage 8 and then executes the program. However, the embodiments are not limited to this case. The term "processor" herein means circuitry such as a central processing unit (CPU), a graphics processing unit (GPU), an application specific integrated circuit (ASIC), a programmable logic device (for example, a simple programmable logic device (SPLD) or a complex programmable logic device (CPLD)), or a field programmable gate array (FPGA). If the processor is a CPU, for example, the processor performs a function by reading a program stored in the storage 8 and executes the program. If the processor is an ASIC, the processor has the function realized as a logic circuit instead of storing a corresponding program in the storage 8. The processor in each of the embodiments may be formed of a single circuit, or a combination of a plurality of distinct circuits to perform the function. The components shown in FIG. 1 may be integrated into a single processor to perform their respective functions.

While certain embodiments have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An automatic analyzer, comprising:
a calibration curve generator configured to generate a first calibration curve indicating a first relationship between a concentration and an absorbance based on a result of first optical measurements of reaction solutions obtained by adding a reagent to reference samples each having a known, but different, concentration of an object to be detected, the calibration curve generator being further configured to generate a second calibration curve indicating a second relationship between the concentration and the absorbance based on a result of second optical measurements of the reaction solution obtained by adding the reagent to the reference sample, wherein the second optical measurements are performed after a predetermined time passes after the first optical measurements; and
a correction coefficient calculator configured to calculate a correction coefficient for a correction function, the correction function indicating a correlation of a blank value and a gradient of a calibration curve based on:
a first blank value, which is a blank value of the first calibration curve, wherein the blank value is the absorbance when the concentration of the object to be detected is zero;
a first gradient, which is a gradient of the first calibration curve;
a second blank value, which is the blank value of the second calibration curve; and
a second gradient, which is a gradient of the second calibration curve,
wherein the calibration curve generator is further configured to generate a corrected calibration curve, and the calibration curve generator is further configured to
(1) calculate a corrected gradient of the corrected calibration curve with the correction function based on:
(a) a third blank value, which is a blank value obtained from a result of a third optical measurement of the reaction solution when the concentration of the object to be detected is zero or a fourth optical measurement of the reagent after the correction coefficient is calculated, wherein the third optical measurement or the fourth optical measurement is performed after the second optical measurements, and
(b) the correction coefficient calculated by the correction coefficient calculator, and
(2) generate the corrected calibration curve based on the third blank value and the corrected gradient.

2. The automatic analyzer according to claim 1, wherein the calibration curve generator is further configured to generate the second calibration curve when a remaining amount of the reagent in a reagent bottle is equal to or less than a predetermined amount.

3. The automatic analyzer according to claim 1, wherein the calibration curve generator is further configured to generate the second calibration curve when the predetermined time lapses after the first calibration curve is generated.

4. The automatic analyzer according to claim 1, wherein the correction coefficient calculator is further configured to calculate the correction coefficient for the correction function by a formula:

(second gradient−first gradient)/(second blank value−first blank value), and wherein each gradient is defined as concentration/absorbance.

5. The automatic analyzer according to claim 4, wherein the corrected gradient is calculated by a formula:

first gradient+correction coefficient×(third blank value−first blank value).

6. The automatic analyzer according to claim 1,
wherein the correction coefficient includes a first correction coefficient and a second correction coefficient, and
wherein the correction coefficient calculator is further configured to:
set an equation for the first calibration curve as:

first gradient×first blank value=first correction coefficient+second correction coefficient×first blank value, set an equation for the second calibration curve as:

second gradient×second blank value=first correction coefficient+second correction coefficient×second blank value, and calculate the first correction coefficient and the second correction coefficient based on the equations, wherein each of the first gradient and the second gradient is defined as concentration/absorbance.

7. The automatic analyzer according to claim 6, wherein the corrected gradient is calculated by the formula:

first correction coefficient/third blank value+second correction coefficient.

8. The automatic analyzer according to claim 1, further comprising:
a sample concentration calculator configured to perform an optical measurement of a reaction solution obtained by adding the reagent to a sample to be tested including the object to be detected, and calculate a concentration of the object to be detected in the sample to be tested based on a result of the optical measurement and the corrected calibration curve.

9. The automatic analyzer according to claim 1, wherein the first calibration curve, the second calibration curve, and the corrected calibration curve are linear or nonlinear calibration curves.

* * * * *